US012355511B2

(12) United States Patent
    Svendsen et al.

(10) Patent No.: US 12,355,511 B2
(45) Date of Patent: Jul. 8, 2025

(54) BEAM CONFIGURATION

(71) Applicant: NOKIA TECHNOLOGIES OY, Espoo (FI)

(72) Inventors: Simon Svendsen, Aalborg (DK); Ingo Viering, Munich (DE); Sami Hakola, Kempele (FI); Christian Rom, Aalborg (DK); Samantha Caporal Del Barrio, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 267 days.

(21) Appl. No.: 18/016,573

(22) PCT Filed: Jun. 15, 2021

(86) PCT No.: PCT/EP2021/066030
§ 371 (c)(1),
(2) Date: Jan. 17, 2023

(87) PCT Pub. No.: WO2022/012832
PCT Pub. Date: Jan. 20, 2022

(65) Prior Publication Data
US 2024/0171226 A1    May 23, 2024

(30) Foreign Application Priority Data

Jul. 15, 2020  (EP) .................................. 20185933

(51) Int. Cl.
    *H04B 7/0404*      (2017.01)
    *H04B 7/024*       (2017.01)
    (Continued)

(52) U.S. Cl.
    CPC ........... *H04B 7/0404* (2013.01); *H04B 7/024* (2013.01); *H04B 7/06958* (2023.05); *H04B 7/088* (2013.01)

(58) Field of Classification Search
    CPC .. H04B 7/0404; H04B 7/024; H04B 7/06958; H04B 7/088; H04B 7/063; H04B 7/0695; H04W 36/0058
    (Continued)

(56) References Cited

U.S. PATENT DOCUMENTS 8,804,612 B1   8/2014  Chen et al.
10,306,524 B2  5/2019  Axmon et al.
(Continued)

FOREIGN PATENT DOCUMENTS

CN   110582951 A   12/2019
EP   2 869 630 A1   5/2015
(Continued)

OTHER PUBLICATIONS

3GPP TS 38.331 V16.0.0 (Mar. 2020), Technical Specification, 3rd Generation Partnership Project; Technical Specification Group Radio Access Network; NR; Radio Resource Control (RRC) protocol specification (Release 16), Mar. 2020.
(Continued)

*Primary Examiner* — Don N Vo
(74) *Attorney, Agent, or Firm* — Robert P. Michal, Esq.; Carter, DeLuca & Farrell LLP (57) ABSTRACT

An apparatus comprising means for:
  changing an antenna configuration of the apparatus used to enable operation of the apparatus as a
  first node of a radio telecommunication network;
  creating an antenna configuration correction index (ACCI) of the first node;
  providing the antenna configuration correction index of the first node for use in a beam selection procedure for enabling data communication by the first node.

7 Claims, 7 Drawing Sheets

(51) Int. Cl.
*H04B 7/06* (2006.01)
*H04B 7/08* (2006.01)

(58) Field of Classification Search
USPC ............................................. 455/524
See application file for complete search history.

(56) References Cited

U.S. PATENT DOCUMENTS

| | | | |
|---|---|---|---|
| 11,245,445 B1* | 2/2022 | Marupaduga | H04W 36/247 |
| 2015/0222345 A1 | 8/2015 | Chapman et al. | |
| 2015/0257118 A1* | 9/2015 | Siomina | G01S 5/021 |
| | | | 455/456.1 |
| 2019/0116507 A1* | 4/2019 | Bizzarri | H04B 7/0617 |
| 2019/0357059 A1* | 11/2019 | Frenger | H04W 16/28 |
| 2020/0053608 A1 | 2/2020 | Tao et al. | |
| 2020/0120622 A1 | 4/2020 | Yoon et al. | |
| 2020/0128417 A1 | 4/2020 | Yoon et al. | |

FOREIGN PATENT DOCUMENTS

| | | |
|---|---|---|
| EP | 3 399 662 A1 | 11/2018 |
| JP | 2019-087915 A | 6/2019 |
| JP | 2020-519056 A | 6/2020 |
| WO | 2017/119077 A1 | 7/2017 |
| WO | 2019/048932 A1 | 3/2019 |
| WO | 2019/103664 A1 | 5/2019 |
| WO | 2021/160263 A1 | 8/2021 |

OTHER PUBLICATIONS

Office Action received for corresponding Japanese Patent Application No. 2023-502732, dated Nov. 28, 2024, 3 pages of Office Action and 2 pages of summary available.

"3rd Generation Partnership Project; Technical Specification Group Radio Access Network; NR; Multiplexing and channel coding (Release 16)", 3GPP TS 38.212, V16.1.0, Mar. 2020, pp. 1-146.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"New WID: Further enhancements on MIMO for NR", 3GPP TSG RAN Meeting #86, RP-193133, Agenda Item: 9.1.1, Samsung, Dec. 9-12, 2019, 5 pages.

"Beam Reciprocity Aspects", 3GPP TSG RAN WG1 Meeting #87, R1-1612058, Agenda Item: 7.1.3.3, Qualcomm Incorporated, Nov. 14-18, 2016, 11 pages.

"Impact of beam/channel reciprocity for NR", 3GPP TSG RAN WG1 #86 bis, R1-1609082, Agenda item: 8.1.4.1, Samsung, Oct. 10-14, 2016, 4 pages.

"Discussion on signaling of beam correspondence", 3GPP TSG RAN WG1 Meeting #94bis, R1-1811086, Agenda Item: 7.2.8.3, Fraunhofer IIS, Oct. 8-12, 2018, 5 pages.

"Definition of beam correspondence and beam correspondence determination mechanism", 3GPP TSG-RAN WG1- NR, R1-1700599, Agenda item: 5.1.2.2, NTT Docomo, Inc., Jan. 16-20, 2017, pp. 1-3.

"Discussion on beam correspondence", 3GPP TSG RAN WG1 NR AH, R1-1700925, Agenda item: 5.1.2.2, Samsung, Jan. 16-20, 2017, 3 pages.

"3rd Generation Partnership Project; Technical Specification Group Radio Access Network; NR; User Equipment (UE) radio transmission and reception; Part 1: Range 1 Standalone (Release 16)", 3GPP TS 38.101-1, V16.3.0, Mar. 2020, pp. 1-332.

Extended European Search Report received for corresponding European Patent Application No. 20185933.7, dated Dec. 17, 2020, 11 pages.

Office Action received for corresponding European Patent Application No. 20185933.7, dated Nov. 27, 2023, 6 pages.

International Search Report and Written Opinion dated Sep. 9, 2021 corresponding to International Patent Application No. PCT/EP2021/066030.

Office Action received for corresponding Japanese Patent Application No. 2023-502732, dated Apr. 1, 2024, 7 pages of Office Action and 16 pages of summary and translation available.

* cited by examiner

BEAM CONFIGURATION

TECHNOLOGICAL FIELD

Embodiments of the present disclosure relate to beam configuration. Some relate to correcting for the effects of changes in beam configuration.

BACKGROUND

A node of a radio telecommunications network, such as a radio terminal or base station, can use a variable antenna configuration for communication in the radio telecommunication network. In some examples, a node can select between spatially diverse antenna panels or antennas. In some examples to perform beamforming, a node can selectively use or controllably use different antenna elements within an antenna array of an antenna panel, for example use different weights for the antenna elements. In some examples, the antenna configuration at a radio terminal can be controlled, at least partially, by the radio terminal.

BRIEF SUMMARY

According to various, but not necessarily all, embodiments there is provided an apparatus comprising means for: changing an antenna configuration of the apparatus used to enable operation of the apparatus as a first node of a radio telecommunication network; creating an antenna configuration correction index (ACCI) of the first node; providing the antenna configuration correction index of the first node for use in a beam selection procedure for enabling data communication by the first node.

In some but not necessarily all examples, the antenna configuration correction index quantizes an antenna configuration correction dependent upon a change in antenna configuration between an antenna configuration used by the first node during a measurement scenario and an antenna configuration used by the first node during a data communication scenario.

In some but not necessarily all examples, the antenna configuration correction index quantizes a link budget correction to be applied to a link budget measured during a measurement scenario to at least partially correct a potential link budget available during the data communication scenario.

In some but not necessarily all examples, the first node is a user equipment, and wherein providing the antenna configuration correction index comprises providing the antenna configuration correction index to a serving base station operating as another node of the radio telecommunications network for use by the serving base station in a beam selection procedure for the user equipment.

In some but not necessarily all examples, the first node is a user equipment, and wherein providing the antenna configuration correction index comprises providing the antenna configuration correction index within the first node for use in a procedure at the first node that comprises providing, at least, the antenna configuration correction index to a serving base station operating as another node of the radio telecommunications network for use by the serving base station in a beam selection procedure for the user equipment.

In some but not necessarily all examples, the procedure at the first node comprises providing to the serving base station at least a measurement made at the first node.

In some but not necessarily all examples, the measurement made at the first node is part of a handover or conditional handover procedure or a beam management procedure.

In some but not necessarily all examples, the apparatus comprises means for:
providing to a serving base station the antenna configuration correction index of the first node for a link to the serving base station; and
providing to the serving base station a measurement made at the first node for a link to the serving base station.

In some but not necessarily all examples, the apparatus comprises means for:
providing to the serving base station the antenna configuration correction index of the first node for a link to a neighboring non-serving base station; and
providing to the serving base station a measurement made at the first node for the link to the neighboring non-serving base station.

In some but not necessarily all examples, the apparatus comprises means for:
providing to the serving base station an identification of a beam from the non-serving base station used to make the measurement at the first node for the link to the neighboring non-serving base station.

In some but not necessarily all examples, the first node is a serving base station; and wherein providing the antenna configuration correction index comprises providing the antenna configuration correction index within the first node for use in a beam selection procedure for user equipment operating as another node of the radio telecommunications network In some but not necessarily all examples, the apparatus comprises means for:
receiving at the serving base station an antenna configuration correction index of a UE for a link to the serving base station; and receiving at the serving base station a measurement made at the UE for the link to the serving base station.

In some but not necessarily all examples, the apparatus comprises means for:
receiving at the serving base station an antenna configuration correction index of the UE for a link to a neighboring non-serving base station; receiving at the serving base station a measurement made at the UE for the link to the neighboring non-serving base station; and receiving at the serving base station an antenna configuration correction index of a non-serving base station for a link to the UE.

In some but not necessarily all examples, the apparatus comprises means for:
receiving at the serving base station an identification of beam of a non-serving base station.

In some but not necessarily all examples, the first node is a neighboring non-serving base station, and wherein providing the antenna configuration correction index comprises providing, in response to a request indicating a beam, the antenna configuration correction index associated with the beam a serving base station for use by the serving base station in a beam selection procedure for the user equipment According to various, but not necessarily all, embodiments there is provided a method comprising:
changing an antenna configuration of the apparatus used to enable operation of the apparatus as a first node of a radio telecommunication network;
creating an antenna configuration correction index (ACCI) of the first node; providing the antenna configuration correction index of the first node for use in a beam selection procedure for enabling data communication by the first node.

According to various, but not necessarily all, embodiments there is provided a computer program that when run on one or more processors enables:

changing an antenna configuration of the apparatus used to enable operation of the apparatus as a first node of a radio telecommunication network; creating an antenna configuration correction index (ACCI) of the first node;

providing the antenna configuration correction index of the first node for use in a beam selection procedure for enabling data communication by the first node.

According to various, but not necessarily all, embodiments there is provided an apparatus comprising means for:

changing an antenna configuration of the apparatus used to enable operation of the apparatus as a first node of a radio telecommunication network, wherein the first node is a user equipment;

creating an antenna configuration correction (ACC) of the first node; providing the antenna configuration correction of the first node to a serving base station operating as another node of the radio telecommunications network for use by the serving base station in a beam selection procedure for the user equipment;

providing to the serving base station an identification of a beam from the non-serving base station used to make a measurement at the first node for a link to the neighboring non-serving base station.

According to various, but not necessarily all, embodiments there is provided an apparatus comprising means for: changing an antenna configuration of the apparatus used to enable operation of the apparatus as a first node of a radio telecommunication network;

creating an antenna configuration correction (ACC) of the first node;

providing the antenna configuration correction of the first node for use in a beam selection procedure for enabling data communication by the first node, wherein the first node is a user equipment, and wherein providing the antenna configuration correction comprises providing the antenna configuration correction within the first node to trigger a procedure at the first node that comprises providing, at least, the antenna configuration correction to a serving base station operating as another node of the radio telecommunications network for use by the serving base station in a beam selection procedure for the user equipment, wherein the triggering the procedure is dependent upon:

an antenna configuration correction of the first node for a link to the serving base station;

an antenna configuration correction of the first node for a link to a neighboring non-serving base station; and an antenna configuration correction of the serving base station for a link to the first node;

an antenna configuration correction of the non-serving base station for a link to the first node;

a measurement made at the first node for a link to the serving base station;

a measurement made at the first node for the link to the neighboring non-serving base station.

In at least some examples, the procedure triggered at the first node comprises providing to the serving base station at least a measurement made at the first node According to various, but not necessarily all, embodiments there is provided a base station apparatus comprising means for:

receiving a first antenna configuration correction of a user equipment of a radio telecommunication network, for a first radio link between the user equipment and the base station apparatus;

receiving a second antenna configuration correction of the user equipment of the radio telecommunication network, for a second link between the user equipment and another base station of the radio telecommunication network;

receiving a third antenna configuration correction of the another base station of the radio telecommunication network, for the second link between the user equipment and the another base station of the radio telecommunication network;

obtaining a fourth antenna configuration correction of the base station apparatus, for the first link between the user equipment and the base station apparatus; using the first, second, third and fourth antenna configuration corrections in a beam selection procedure for enabling data communication for the user equipment.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
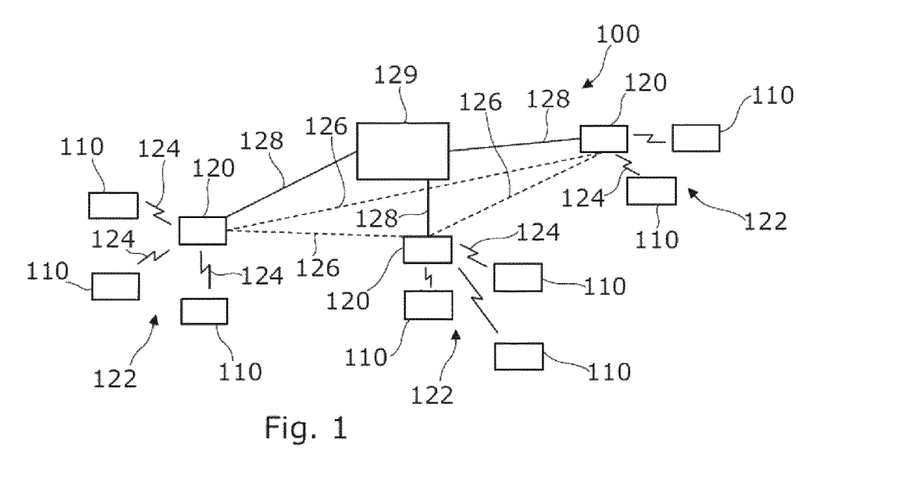
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

Figure 2A:
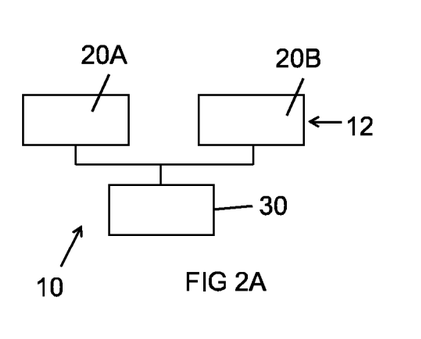
FIG. 2A shows another example of the subject matter described herein.
Figure 2B:
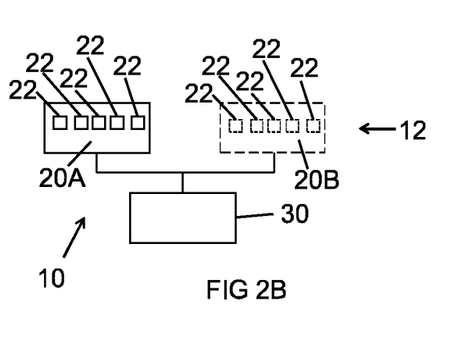
FIG. 2B shows another example of the subject matter described herein.

FIGS. 2A and 2B illustrate examples of a node of a radio telecommunications network 100. The node is an apparatus 10. The apparatus 10 can operate as a user equipment 110 or other terminal node, or it can operate as base station 120 or other access node.

The apparatus 10 comprises communication circuitry 30 that is configured to communicate in the radio telecommunications network 100 via one or more antenna panels 20. An antenna panel 20 can comprise a single antenna element 22 or can comprise multiple antenna elements 22.

FIG. 2A illustrates an apparatus 10 that has multiple antenna panels 20A, 20B. In some scenarios, the apparatus can use the antenna panel 20A. In other scenarios the apparatus 10 can use the antenna panel 20B. The apparatus 10 is therefore capable of having a variable antenna configuration.

FIG. 2B illustrates an apparatus 10 that comprises at least one antenna panel 20A. The antenna panel 20A comprises a plurality of antenna elements 22. The apparatus can use the antenna elements 22 for beamforming by adapting which of the antenna elements 22 are used or by varying the relative gain and/or phase offset applied to the antenna elements 22. The apparatus 10 is therefore capable of having a variable antenna configuration.

In some examples, the apparatus 10 as illustrated in FIG. 2B can comprise an one or more additional antenna panels 20B, for example as illustrated in FIG. 2A. This additional antenna panel or additional multiple antenna panels can comprise one or more antenna elements 22. Each of the antenna panels and the antenna elements 22 of the antenna panels can be selectively controlled for beamforming.

It will therefore be appreciated that the antenna configuration of the apparatus 10 can be varied by selecting which one of an antenna panel 20A, 20B is operational, selecting which ones of antenna elements 22 within an antenna panel is operational or by applying the variable weights and/or phase offsets to antenna elements 22 to provide beamforming.

Each different antenna configuration 12 has a different associated gain that is dependent upon the radiation beam pattern created by the antenna configuration 12. Thus, for example, a narrower beam pattern will have a higher gain than a broad beam pattern.

Figure 3:
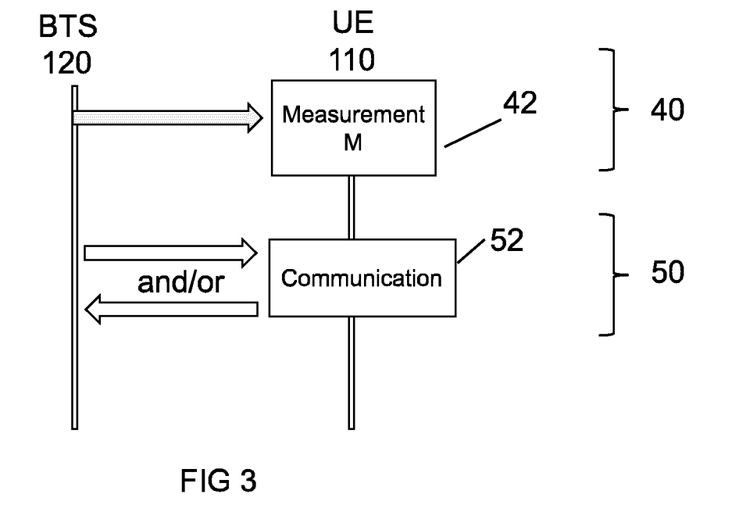
FIG. 3 shows another example of the subject matter described herein.

FIG. 3 illustrates an example in which user equipment 110 measures 42 a probe signal transmitted by a base station 120. The measurement 42 occurs during a measurement scenario 40. The figure also illustrates a communication scenario 50 in which the user equipment 110 communicates 52 with the same base station 120. The communication 52 can be for example the transmission of data and/or the reception of data.

The measurement M performed by the user equipment 110 during the measurement 42 of the measurement scenario 40 is dependent on the transmitting antenna configuration 12 at the base station 120 and of the receiving antenna configuration 12 at the user equipment 110. The strength of a received data signal, received at the user equipment 110, is dependent upon the transmitting antenna configuration 12 at the base station 120 and the receiving antenna configuration 12 at the user equipment 110. The strength of a received data signal, received at the base station 120, is dependent on the transmitting antenna configuration 12 at the user equipment 110 and the receiving antenna configuration 12 at the base station 120.

Consequently, measurement M made by the user equipment 110 during the measurement scenario 40 may not be accurate for a data communication scenario 50. This can be because of a change in antenna configuration 12 used by the base station 120 between the measurement scenario 40 and the data communication scenario 50. This can also or alternatively be because of a change in antenna configuration 12 used by the user equipment 110 between the measurement scenario 40 and the data communication scenario 50.

A link budget measured during the measurement scenario 40 by the user equipment 110 may therefore need a "correction" to properly represent a potential link budget available during the data communication scenario 50.

The correction for a link budget, the antenna configuration correction (ACC), can have a component associated with a change in antenna configuration 12 used by a base station 120 between the measurement scenario 40 and the data communication scenario 50. The correction for the link budget can have a component associated with a change in antenna configuration 12 used by a user equipment 110 between the measurement scenario 40 and the data communication scenario 50. It would be desirable to compensate for both corrections. This will allow communication between the user equipment 110 and the network 100, to be controlled by procedures and decisions based on an expected potential link budget for the data communication scenario 50 that has been corrected.

Let $ACC_{xY}$ represent the correction component for a link budget associated with a change in antenna configuration used by a node Y, for link x, between the measurement scenario 40 and the data communication scenario 50. The node Y can be a user equipment (UE) 110 or a base station (BTS) 120. The link x can be for a serving (primary) base station $120_p$ ($BTS_p$) or (where appropriate e.g. for handover) for a neighboring base station $120_n$ ($BTS_n$)

Therefore the correction for a link budget, for a serving base station $120_p$ ($BTS_p$) can have:
  i) a component $ACC_{pBTS}$ associated with a change in antenna configuration 12 used by a serving base station $120_p$ ($BTS_p$) between the measurement scenario 40 and the data communication scenario 50.
  ii) a component $ACC_{pUE}$ associated with a change in antenna configuration 12 used by a user equipment UE (with the serving base station $120_p$) between the measurement scenario 40 and the data communication scenario 50.

Therefore the correction for a link budget, for a neighboring base station $120_n$ ($BTS_n$) can have:
  i) a component $ACC_{nBTS}$ associated with a change in antenna configuration 12 used by a neighboring base station $120_n$ ($BTS_n$) between the measurement scenario 40 and the data communication scenario 50.
  ii) a component $ACC_{nUE}$ associated with a change in antenna configuration 12 used by a user equipment UE (with the neighboring base station $120_n$) between the measurement scenario 40 and the data communication scenario 50.

The correction for a link budget associated with the link between the serving base station $120_p$ ($BTS_p$) and the user equipment 110 is (assuming dB units): $ACC_{pBTS}+ACC_{pUE}$. This represents a difference in gain for this link between the measurement scenario 40 and the data communication scenario 50.

The correction for a link budget associated with the link between the neighboring base station $120_n$ ($BTS_n$) and the user equipment 110 is (assuming dB units): $ACC_{nBTS}+ACC_{nUE}$. This represents a difference in gain for this link between the measurement scenario 40 and the data communication scenario 50.

Procedure and decisions can be based on an expected potential link budget for the data communication scenario 50 that has been corrected. The procedure and decisions can control directly or indirectly beam selection for user equipment communication.

The procedure or decision may be one that occurs at user equipment e.g. trigger measurement reporting for beam selection. The procedure or decision may be one that occurs at the serving base station $120_p$ ($BTS_p$) e.g. beam selection The UE components of antenna configuration correction $ACC_{pUE}$, $ACC_{nUE}$ are known at the user equipment 110. The serving BTS component of antenna configuration correction $ACC_{pBTS}$ is known at the serving BTS. The neighboring BTS component of antenna configuration correction $ACC_{nBTS}$ is known at the neighboring BTS.

In at least some examples, the UE components of antenna configuration correction $ACC_{pUE}$, $ACC_{nUE}$ (or a value dependent upon them) can be transferred from the user equipment 110 to the serving base station $120_p$ ($BTS_p$). In at least some examples, the neighboring BTS component of antenna configuration correction $ACC_{nBTS}$ (or a value dependent upon it) can be transferred from the neighboring BTS to the serving base station $120_p$ ($BTS_p$).

In at least some examples, the BTS components of antenna configuration correction $ACC_{pBTS}$, $ACC_{nBTS}$ (or a value dependent upon them) can be transferred from the serving BTS to the UE 110.

It can, in some examples, be desirable to transfer an index representative of the antenna configuration correction (ACC) or the components of antenna configuration correction ($ACC_{pUE}$, $ACC_{pUE}$, $ACC_{pBTS}$, $ACC_{nBTS}$) rather than values of the antenna configuration correction or the values of the components of antenna configuration correction. Such an index is an antenna configuration correction index (ACCI).

Figure 4:
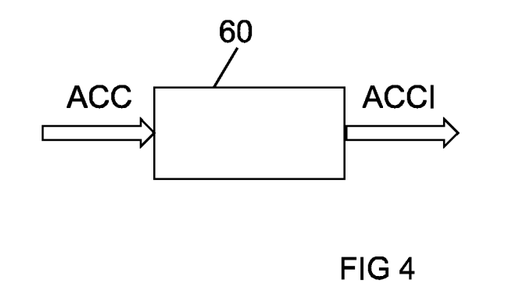
FIG. 4 shows another example of the subject matter described herein.

As illustrated in FIG. 4, the ACC can, for example, be a processed 60 to produce the ACCI.

The process 60 can, for example, involve quantization where ACCI represents the number of quanta (steps) within the ACC. Any suitable quantisation procedure may be suitable.

e.g.

ACCI=floor(ACC/step), where the quantized version of ACC based on ACCI is step*ACCI.

Any suitable step size can be used. The step size can be fixed or variable. If variable it can be defined by the user equipment 110 or by the serving base station $120_p$. A suitable step size can be 1-5 dB, for example 3 dB.

In some examples, $ACCI_{xY}=\log_2(R_{xY})$ or $ACC_{xY}=\log_2(R_{xY})$ where $R_{xY}$ represents a relative maximum directivity that could be achieved in data communication (max gain potential).

In one example (a),
  $R_{xY}$=total number of antenna elements 22 configurable to serve link x at the node Y during data communication scenario 50/number of antenna elements 22 configured to serve link x at the node Y during measurement scenario 40.

In another example (b),
  $R_{xY}$=configured angular radiation beam width used to serve link x at the node Y during measurement scenario 40/minimum configurable angular radiation beam width usable to serve link x at the node Y during data communication scenario 50.

In another example (c),
  $R_{xY}$=maximum linear gain configurable to serve link x at the node Y during data communication scenario 50/linear gain configured to serve link x at the node Y during measurement scenario 40.

The example (a) is usable when a subset of antenna elements 22 in an antenna panel 20 are used in the measurement scenario 40.

The examples (b) and (c) can also be used in this example, and they also have application when different weights are used for the antenna elements 22 of an antenna panel 20 between the measurement scenario 40 and the communication scenario 50.

$ACCI_{xY}$ can be transferred as a short bit sequence.

Figure 5:
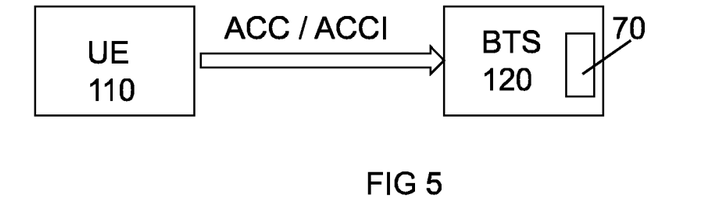
FIG. 5 shows another example of the subject matter described herein.

As illustrated in FIG. 5, in at least some examples, the UE-based ACCIs ($ACCI_{pUE}$, $ACCI_{nUE}$) or a value dependent upon them are transferred from the user equipment 110 to the serving base station $120_p$ ($BTS_p$).

In at least some examples, the neighboring BTS ACCI ($ACCI_{nBTS}$) or a value dependent upon it can be transferred from the neighboring base station 120 ($BTS_n$) to the serving base station $120_p$ ($BTS_p$).

In at least some examples, the BTS components of ACCI ($ACCI_{pBTS}$, $ACCI_{nBTS}$) or a value dependent upon them can be transferred from the serving base station $120_p$ ($BTS_p$) to the UE 110.

The ACC or ACCI can be used in a beam selection procedure 70. The beam selection procedure 70 can involve the serving base station $120_p$ ($BTS_p$). It can therefore be desirable for the serving base station $120_p$ ($BTS_p$) to receive all the ACC or ACCI.

Figure 8:
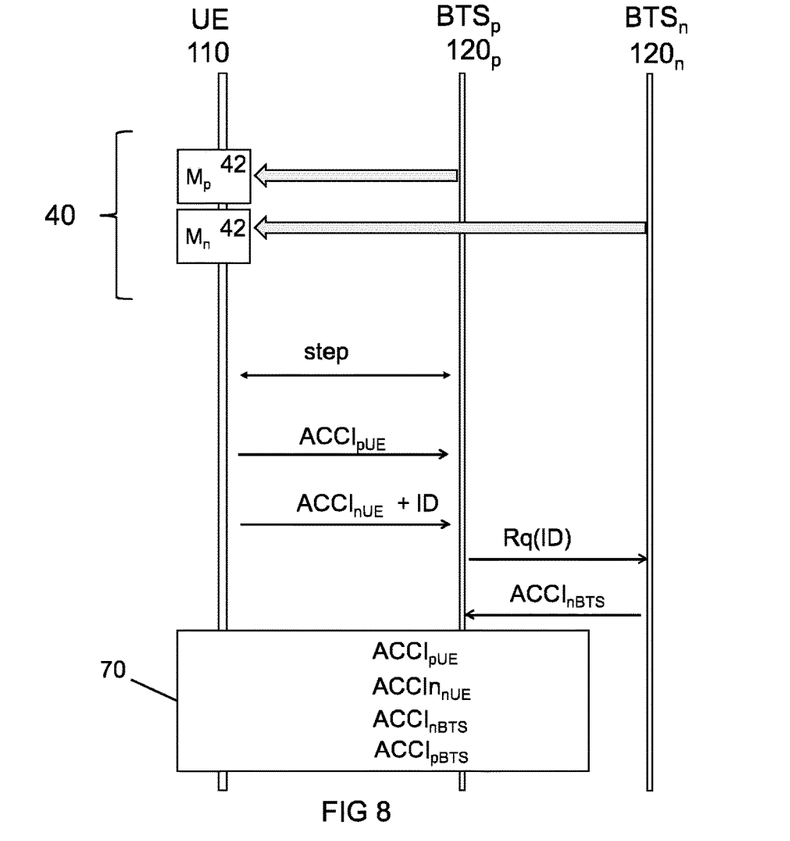
FIG. 8 shows another example of the subject matter described herein.

The beam selection procedure can be a procedure relating to an inter-cell selection (FIGS. 8A-8C), for example handover (HO) or conditional handover (CHO). The procedure can be a decision to handover or not handover or a precursor steps to that decision. The beam selection can comprise selection of a new beam of a new serving base station 120 (previously the neighboring base station). The four components of antenna configuration correction $ACC_{pBTS}$, $ACC_{pUE}$, $ACC_{nBTS}$, $ACC_{nUE}$ (or $ACCI_{pBTS}$, $ACCI_{pUE}$, ACCInBTS $ACCI_{nUE}$) can be used.

The beam selection can be an intra-cell selection (FIGS. 7A-7B) for example beam management (BM). The procedure can be a decision to change a beam or not, or a precursor step to that decision. The beam selection can comprise selection of a new beam of the same serving base station 120. The two components of antenna configuration correction for the serving cell $ACC_{pBTS}$, $ACC_{pUE}$ (or $ACCI_{pBTS}$, $ACCI_{pUE}$) can be used.

Figure 7A:
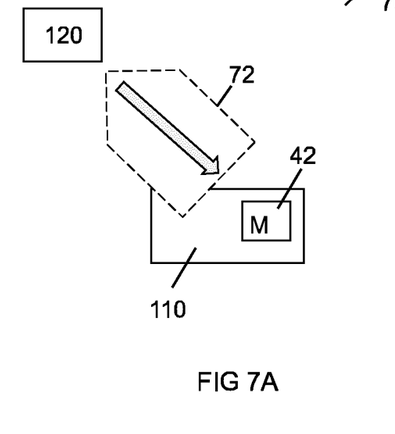
FIG. 7A, 7B show another example of the subject matter described herein.
Figure 7B:
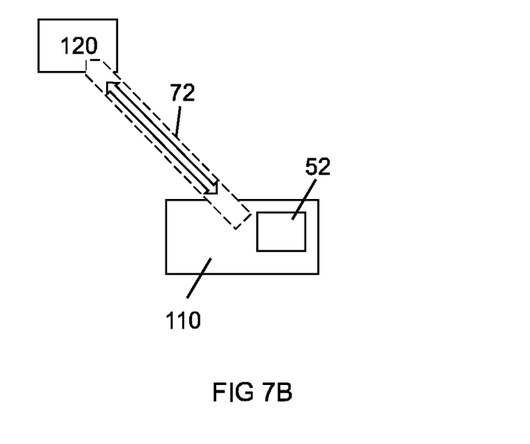

If a new beam is selected then the antenna configurations 12 for that link are used. This can result in using a different antenna panel 20 or using different antenna elements 22 of an antenna panel at the UE 110 or using different complex weights for antenna elements 22 of an antenna panel 20 at the UE 110.

Figure 6A:
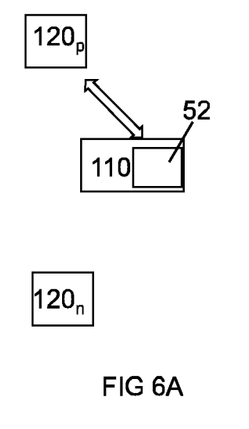
FIG. 6A, 6B, 6C show another example of the subject matter described herein.
Figure 6B:
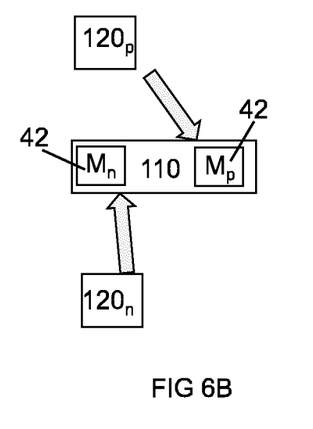

In FIG. 6A, the user equipment 110 performs data communication 52 with the serving base station $120_p$ during a communication scenario 50. FIG. 6B illustrates a measurement scenario 40. The user equipment 110 performs a measurement 42 of a reference signal transmitted by the serving base station $120_p$ and determines an estimate $M_p$ of the link budget for the downlink from the serving base station $120_p$ to the user equipment 110. The user equipment 110 performs a measurement 42 of a reference signal transmitted by the neighboring base station $120_n$ and determines an estimate $M_n$ of the link budget for the downlink from the neighboring base station $120_n$ to the user equipment 110.

Figure 6C:
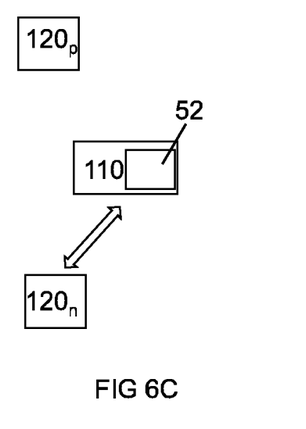

In this example, the beam selection procedure 70 causes a handover from the serving base station $120_p$ to the neighboring base station $120_n$ as illustrated in FIG. 6C. The serving base station $120_p$ has therefore changed. The mobile equipment 110, during the communication scenario 50, communicates 52 with the new serving base station $120_p$.

FIG. 7A illustrates an example in which a user equipment 110, during the measurement scenario 40, measures 42 a reference signal transmitted by a base station 120 using an antenna beam 72. The beam selection procedure 70 causes the selection of a new beam 72 that is used for data communication 52 between the user equipment 110 and the base station 120 as illustrated in FIG. 7B.

FIG. 8 illustrates an example suitable for controlling handover or conditional handover as illustrated in FIGS. 6A to 6C. The user equipment 110, during a measurement scenario 40, measures 42 the downlink budget $M_p$ associated with the serving base station $120_p$. The user equipment 110, during a measurement scenario 40, measures 42 the downlink budget $M_n$ associated with the neighboring base station $120_n$.

A step value is either fixed or is provided by the user equipment 110 to the serving base station $120_p$ or is provided by the serving base station $120_p$ to the user equipment 110.

The step value is used to quantize $ACC_{pUE}$ to produce $ACCI_{pUE}$ and to quantize $ACC_{nUE}$ to provide $ACCI_{nUE}$. The $ACCI_{pUE}$ is provided by the user equipment 110 to the serving base station $120_p$. The ACCI n u E is provided by the user equipment 110 to the serving base station $120_p$. In addition, the user equipment 110 also identifies the beam 72 of the neighboring base station $120_n$ that was received by the user equipment 110 during the measurement scenario 40 to produce the downlink budget value $M_n$.

The measurements $M_n$ and $M_p$ can, in some examples, also be sent from the user equipment 110 to the serving base station $120_p$.

The measurements $M_n$ and $M_p$ can be sent together or separately. The identifier of the beam 72 can be sent with the measurement $M_n$ for that beam 72.

The identifier of the beam 72 can be received from the neighboring base station $120_n$.

The serving base station $120_p$, in response, sends a request to the neighboring base station $120_n$ including the identifier of the beam 72. The serving base station $120_p$ provides, in reply, $ACC_{nBTS}$ or $ACCI_{nBTS}$ to the serving base station $120_p$. The $ACC_{nBTS}$ or $ACCI_{nBTS}$ relates to the beam of the neighboring base station $120_n$ identified in the request.

In some examples, the request may also include a value of the step.

Next a beam selection procedure 70 is performed using the four indexes ACC or ACCI ($ACC_{pUE}$, $ACC_{pBTS}$, $ACC_{nUE}$, $ACC_{nBTS}$).

The communication of the indexes between the user equipment 110 and the serving base station $120_p$ can, for example, occur at the physical layer (L1), at the media access control layer (L2) or at the radio resource control layer (L3).

The following aspects of beam selection procedure 70 can, for example, include ACC or ACC's: periodic cell reporting for serving and/or neighbor cell, event-triggered reporting, legacy handover and conditional handover. These can be used for handover, conditional handover of beam management.

Figure 9A:
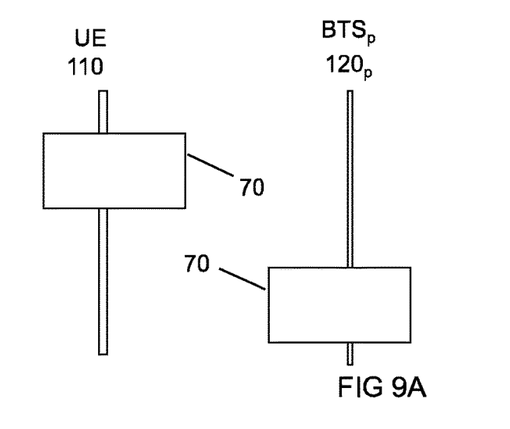
FIG. 9A, 9B show other examples of the subject matter described herein.

Some of all of these processes 70 may be performed by UE 110 (FIG. 9A). For example, the trigger for legacy and/or conditional handover can depend on one of more ACC or ACCI.

Some of all of these processes 70 may be performed by serving base station $120_p$ (FIG. 9A). For example, the assessment of periodic measurement reports from the UE can depend on one of more ACCI. This may be used for beam management, for example.

Figure 9B:
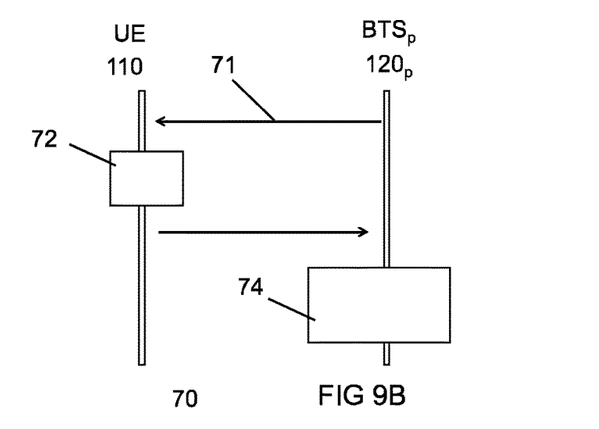

Some of all of the processes may be performed in part by the UE 110 and in part by the serving base station $120_p$ (FIG. 9B). For example, an event-trigger process 72 at the UE 110 that triggers making a handover measurement report can depend on one of more ACC or ACCI and the production 72 or processing 74 of the handover measurement report can depend on one or more ACC or ACCI.

The current A3 event trigging equation used at the UE 110 to send a handover measurement report is:

$$Mn+Ofn+Ocn-Hys>Mp+Ofp+Ocp+Off$$

Mp and Mn are the measurements at the UE 110 of the serving (primary) base station $120_p$ and the neighboring base station $120_n$. The parameters Ofn, Ofp, Off and Hys are offset parameters.

Ocn and Ocp are the cell individual offsets. The measurement $M_n$ of neighbor base station $120_n$ can be upgraded (or downgraded) depending on the neighbor base station $120_n$. The measurement Mp of serving base station $120_p$ can be upgraded (or downgraded) depending on the serving base station $120_p$. Ocn and Ocp can be configured by the network 100.

Ofn is a frequency offset depending on the frequency on which neighbor base station $120_n$ is measured. The network 100 can assign a positive offset if it wants early reporting of cells on this frequency layer, i.e. if it wants to force handovers to such a cell (e.g. for load balancing, or better velocity support, or any other traffic steering policy).

Ofp is a frequency offset depending on the frequency on which serving base station $120_p$ is measured.

The A3 event trigging equation can be explicitly modified to include the ACC's:

$$Mn+Ofn+Ocn-Hys+(step \times (ACCI_{nUE}+ACCI_{nBTS})) > Mp+Ofp+Ocp+Off+(step \times (ACCI_{pUE}+ACCI_{pBTS}))$$

The UE 100 determines $ACCI_{pUE}$, $ACCI_{pUE}$. The respective base stations determine $ACCI_{nBTS}$, $ACCI_{pBTS}$.

The UE 110 therefore needs to acquire $ACCI_{nBTS}$, $ACCI_{pBTS}$ or values dependent upon $ACCI_{nBTS}$, $ACCI_{pBTS}$. The UE 110 either has or needs to acquire step.

The following example illustrate how the UE 110 can acquire $ACCI_{nBTS}$, $ACCI_{pBTS}$ or values dependent upon $ACCI_{nBTS}$, $ACCI_{pBTS}$.

In the following it is assumed that the serving base station $120_p$ has $ACCI_{pBTS}$ and that it has acquired ACCI nBTS from the neighboring bases station $120_n$.

i) The serving base station $120_p$ sends $ACCI_{nBTS}$, $ACCI_{pBTS}$ to the UE 110 in measurement event condition 71. The UE 110 uses, as a trigger: $Mn+Ofn+Ocn-Hys+(step \times (ACCI_{nUE}+ACCI_{nBTS})) > M_p+Ofp+Ocp+Off+(step \times (ACCI_{pUE}+ACCI_{pBTS}))$ ii) The serving base station $120_p$ updates Ocn and Opn:

$Ocn \rightarrow Ocn+offset_n$, where $offset_n = step \times ACCI_{nBTS}$ $Ocp \rightarrow Ocp+offset_p$, where $offset_p = step \times ACCI_{pBTS}$ The updated Ocn and Opn are sent to the UE 110 in measurement event condition 71.

The UE 110 uses, as a trigger:

$$M_n+Ofn+Ocn-Hys+(step \times ACCI_{nUE}) > Mp+Ofp+Ocp+Off+(step \times ACCI_{pUE})$$

iii) The serving base station $120_p$ updates Ocn and Opn: $ACCI_{nUE}$, $ACCI_{pUE}$ are provided by UE 110 to the serving base station $120_p$.

$Ocn \rightarrow Ocn+offset_n$, where $offset_n = step \times (ACCI_{nUE}+ACCI_{nBTS})$ $Ocp \rightarrow Ocp+offset_p$, where $offset_p = step \times (ACCI_{pUE}+ACCI_{pBTS})$ The updated Ocn and Opn are sent to the UE 110 in measurement event condition 71.

The UE 110 uses, as a trigger:

$$Mn+Ofn+Ocn-Hys > Mp+Ofp+Ocp+Off$$

iv) The serving base station $120_p$ updates Ocn only: $ACCI_{nUE}$, $ACCI_{pUE}$ are provided by UE 110 to the serving base station $120_p$.

$Ocn \rightarrow Ocn+offset$, where $offset = step \times (ACCI_{nUE}+ACCI_{nBTS}) - step \times (ACCI_{pUE}+ACCI_{pBTS})$ The updated Ocn is sent to the UE 110 in measurement event condition 71.

The UE 110 uses, as a trigger:

$$Mn+Ofn+Ocn-Hys > Mp+Ofp+Ocp+Off$$

iv) The serving base station $120_p$ provides an offset: $ACCI_{nUE}$, $ACCI_{pUE}$ are provided by UE 110 to the serving base station $120_p$.

$offset = step \times (ACCI_{nUE}+ACCI_{nBTS}) - step \times (ACCI_{pUE}+ACCI_{pBTS})$ The offset is sent to the UE 110 in measurement event condition 71.

The UE 110 uses, as a trigger:

$$Mn+Ofn+Ocn-Hys+offset > Mp+Ofp+Ocp+Off$$

Figure 10:
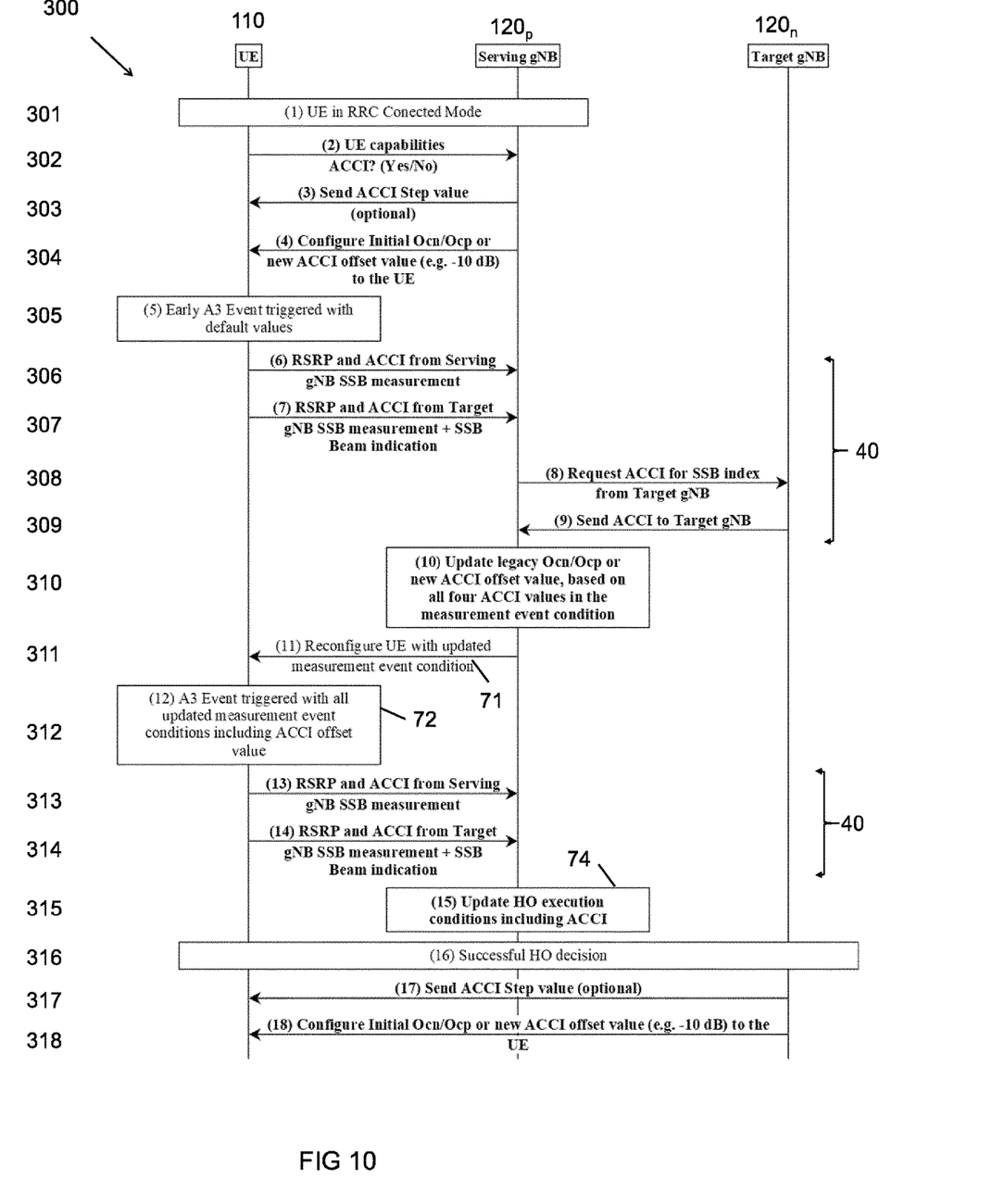
FIG. 10 shows another example of the subject matter described herein.

FIG. 10 illustrates an example of a method 300 for antenna configuration compensation. In particular, it is a method 300 for controlling a beam selection procedure 70 based on antenna configuration compensation.

At stage 301, the UE 110 is connected to the serving gNB $120_p$.

At stage 302, the UE 110 reports to the serving gNB $120_p$ if it is using ACCI or ACC via UE Capability reporting. It can, in some examples, indicate how it is using ACCI.

At stage 302, the serving gNB $120_p$ configures a ACCI step value (if this is a dynamic value) and sends that to the UE 110.

At stage 304, the serving gNB configures an initial legacy Ocn and/or Ocp offset value or a new ACCI offset value (e.g. −10 dB) and sends this to the UE 110 to ensure an early A3 event triggering if needed.

At stage 305, an early A3 event is triggered at the UE.

At stage 306, the UE 110 transmits to the serving gNB $120_p$, the measured RSRP values from measuring the serving SSB of the serving gNB $120_p$. The transmission includes $ACCI_{pUE}$.

At stage 307, the UE 110 transmits to the serving gNB $120_p$, the measured RSRP values from measuring an SSB of the neighboring target gNB $120_n$. The transmission includes $ACCI_{pUE}$ The transmission includes an SSB indicator of the measured SSB of the neighboring target gNB $120_n$.

At stage 308, the serving gNB $120_p$ requests the $ACCI_{ngNB}$ of measured SSB of the neighboring target gNB $120_n$. The request includes an SSB indicator of the measured SSB of the neighboring target gNB $120_n$.

At stage 309, the neighboring target gNB $120_n$ sends, in reply, the $ACCI_{ngNB}$ to the serving gNB $120_p$.

At stage 310, the serving gNB $120_p$ produces a measurement event condition 71 based on all four ACCI values ($ACCI_{pUE}$, $ACCI_{ngNB}$, $ACCI_{pUE}$, $ACCI_{pgNB}$)

The measurement event condition 71 can for example be a) a new ACCI offset value, where $$offset = (_{step}) \times (ACCI_{nUE}+ACCI_{ngNE})) - (_{step}) \times (ACCI_{pUE}+ACCI_{pgNE}))$$

b) an updated value of Ocn and/or Ocp
e.g. Ocn→Ocn+offset

At stage 311, the serving gNB $120_p$ sends the updated measurement event conditions 71 to the UE 110.

At stage 312, an A3 event is triggered 72 with the updated measurement event conditions 71.

The triggering condition can for example be a) $Mn+Ofn+Ocn-Hys+ACCI\_offset > Mp+Ofp+Ocp+Off$, where offset has been provided by the measurement event conditions 71.

b) $Mn+Ofn+Ocn-Hys > Mp+Ofp+Ocp+Off$, where one or both of Ocn and Ocp has been updated by the measurement event conditions 71.

At stage 313, the UE 110 transmits to the serving gNB $120_p$, the measured RSRP values from measuring the serving SSB of the serving gNB $120_p$. The transmission includes $ACCI_{pUE}$.

At stage 314, the UE 110 transmits to the serving gNB $120_p$, the measured RSRP values from measuring an SSB of the neighboring target gNB $120_n$. The transmission includes $ACCI_{pUE}$ The transmission includes an SSB indicator of the measured SSB of the neighboring target gNB $120_n$.

At stage 315, the serving gNB $120_n$ can now execute the handover at the correct time, by updating the HO Execution Threshold in dB and/or time to trigger.

At stage 316, there is a successful handover (HO) decision.

The target gNB is now a new serving gNB after the HO execution.

At stage 317, the new serving gNB $120_p$ (former target gNB$120_n$) configures a ACCI step value if this is a dynamic value and sends that to the UE.

At stage 318, the new serving gNB $120_p$ configures an initial legacy Ocn and/or Ocp offset value or a new ACCI offset value (e.g. −10 dB) and sends this to the UE 110 to ensure early A3 event triggering (305) if needed.

The method 300 can loop.

ACC capabilities and ACCI step value can be reported to the serving gNB $120_p$ via UE capability.

ACC at the UE might not be needed for some UEs, if for example the gain difference between the measuring scenario 40 and the data communication scenario 50 is the same for all the implemented UE antenna panels 20. It could therefore be beneficial if the UE 110 could report this to the serving gNB $120_p$ in order not to send unnecessary information (equal ACCI values) and thereby increase the overhead. The ACC capability can be attached to the following command in the RRC UE capability information.

UECapabilityInformation (3GPP TS 38.331, 5.6.1.3) can be updated to indicate whether or not ACC is supported when ACC step is controlled by the serving gNB or is fixed. UECapabilityInformation (3GPP TS 38.331, 5.6.1.3) can be updated to provide a value for ACC step when ACC step is controlled by the UE 110.

The ACC step can be reported to the UE 110 via RRC reconfiguration.

The $ACC_{UE}$ (e.g. $ACCI_{nUE}$ $ACCI_{pUE}$) can be reported via RRC.

The RSRP values measured at the UE 110 can be reported back to the serving gNB $120_p$ with the MeasResultNR command:

An SSB based RSRP and/or CSI-RS based RSRP is reported back to the serving gNB using the sub-commands ResultsSSBCell and ResultsCSI-RSCell, respectively.

Augment ResultsSSBCell in MeasResultNR command to add ssb-Cell_ACC and ssb-beam-indicator.

```
ResultsSSBCell ::=       SEQUENCE {
    ssb-Cellrsrp         RSRP-Range          OPTIONAL,
    ssb-Cellrsrq         RSRQ-Range          OPTIONAL,
    ssb-Cellsinr         SINR-Range          OPTIONAL,
    ssb-Cell_ACCI        ACC-Value           OPTIONAL,
    ssb-beam-Indicator   SSB-beam-Indicator, OPTIONAL,
}
```

If the measurement report ResultsSSBCell is from the UE 110 for the serving base station $120_p$ then ResultsSSBCell includes the measured RSRP values from measuring an SSB of the serving base station $120_p$ and ssb-Cell_ACCI includes $ACCI_{pUE}$.

If the measurement report ResultsSSBCell is from the UE 110 for the neighboring target base station $120_n$ then ResultsSSBCell includes the measured RSRP values from measuring an SSB of the neighboring target base station $120_n$ and ssb-Cell_ACCI includes $ACCI_{pUE}$ and ssb-beam-Indicator includes an SSB indicator of the measured SSB 72 of the neighboring target base station $120_n$.

Augment ResultsCSI-RSCell in MeasResultNR command to add csi-rs-Cell-ACC and csi-rs-beam-indicator.

```
ResultsCSI-RSCell ::=     SEQUENCE {
    csi-rs-Cellrsrp       RSRP-Range              OPTIONAL,
    csi-rs-Cellrsrq       RSRQ-Range              OPTIONAL,
    csi-rs-Cellsinr       SINR-Range              OPTIONAL,
    csi-rs-Cell-ACCI      ACC-Value               OPTIONAL
    csi-rs-beam-indicator CSI-RS-Beam-Indicator   OPTIONAL
}
```

If the measurement report ResultsCSI-RSCell is from the UE 110 for the serving base station $120_p$ then ResultsCSI-RSCell includes the measured RSRP values from measuring a CSI-RS beam of the serving base station $120_p$ and csi-rs-Cell-ACCI includes $ACCI_{pUE}$.

If the measurement report ResultsCSI-RSCell is from the UE 110 for the neighboring target base station $120_n$ (if supported) then ResultsCSI-RSCell includes the measured RSRP values from measuring a CSI-RS Beam of the neighboring target base station $120_n$ and csi-rs-Cell-ACCI includes $ACCI_{pUE}$ and csi-rs-beam-indicator includes an CSI-RS beam indicator of the measured CSI-RS beam 72 of the neighboring target base station $120_n$.

The $ACC_{UE}$ (e.g. $ACCI_{pUE}$ $ACCI_{pUE}$) can be reported via a MAC CE element.

The $ACC_{UE}$ (e.g. $ACCI_{pUE}$ $ACCI_{pUE}$) can be reported via RRC L1-RSRP Implementation Signalling option where L1-RSRP report for beam management is complemented with ACC value per reported CRI or SSBRI #x. The following example shows how the CSI report for L1-RSRP reporting could look like when UE is configured to report ACC values as well.

| CSI report number | CSI fields |
|---|---|
| CSI report #n | CRI or SSBRI #1 as in Table 6.3.1.1.2-6, if reported |
| | CRI or SSBRI #2 as in Table 6.3.1.1.2-6, if reported |
| | CRI or SSBRI #3 as in Table 6.3.1.1.2-6, if reported |
| | CRI or SSBRI #4 as in Table 6.3.1.1.2-6, if reported |
| | RSRP #1 as in Table 6.3.1.1.2-6, if reported |
| | Differential RSRP #2 as in Table 6.3.1.1.2-6, if reported |
| | Differential RSRP #3 as in Table 6.3.1.1.2-6, if reported |
| | Differential RSRP #4 as in Table 6.3.1.1.2-6, if reported |
| | ACCI #1, if reported |
| | ACCI #2, if reported |
| | ACCI #3, if reported |
| | ACCI #4, if reported |

The $ACC_{ngNB}$ or $ACCI_{ngNB}$ is reported via Xn interface. The messaging at stages 308 and 309, above, can be via the Xn interface.

Additionally, new information (e.g. $ACC_{ngNB}$ or $ACCI_{ngNB}$) can be requested in the HO Request signalled over Xn (from serving gNB $110_p$ to the target neighboring gNB $110_n$). New information (e.g. $ACC_{ngNB}$ or $ACCI_{ngNB}$) can be included in the HO Request Acknowledge signalled over Xn (from the target neighboring gNB $110_n$ gNB to serving gNB $110_p$).

Periodic reporting on the serving gNB $110_p$ gNB can use the ACC or ACCI.

For example, for inter-cell beam management, the serving gNB $110_p$ obtains the $ACCI_{pUE}$ for its own beam 72 seen by the UE 110 to compare with the measurement report from the neighbor gNB $110_n$. Inter-cell beam management uses $ACCI_{pUE}$, $ACCI_{pBTS}$, $ACCI_{nUE}$, $ACCI_{nBTS}$.

For example, periodic reporting is used for intra-cell beam management. If two different beams 72 from the same serving gNB $110_p$ are seen by the UE 110 on two different panels 20A, 20B, then the serving gNB $110_p$ needs the ACCI values of the UE for each link to make an accurate beam switch.

$ACCI_{pUE}$ can be reported regularly to the serving vase station $110_p$. An advantage of reporting $ACCI_{pUE}$ to the serving gNB $110_p$ all the time (regularly), is that it could be used to indicated a rotation of the UE 110 and a switch of panel 20 used at the UE 110 if the $ACCI_{pUE}$ value is suddenly changed.

A panel ID could also be sent with $ACCI_{pUE}$ or when there is a significant change in $ACCI_{pUE}$. There could be a $ACCI_{pUE}$; for each panel $20j$ of the UE 110.

If the serving gNB $110_p$ receives a panel switch identification from the UE 110, it can then revert back to the initialization value of Ocn/Ocp or a new ACCI Offset value, since the HO conditions have changed.

Currently the most common type of handover is triggered by A3 condition, however ACCI may apply to all types of triggers (decided by the serving gNB $110_p$)

Measurement report triggering:

Event A1 (Serving becomes better than threshold)
Event A2 (Serving becomes worse than threshold)
Event A3 (Neighbor becomes offset better than SpCell)
Event A4 (Neighbor becomes better than threshold)
Event A5 (SpCell becomes worse than threshold) and neighbor becomes better than threshold2)
Event A6 (Neighbor becomes offset better than SCell)
Event B1 (Inter RAT neighbor becomes better than threshold)
Event B2 (PCell becomes worse than threshold) and inter RAT neighbor becomes better than threshold2).

Figure 11:
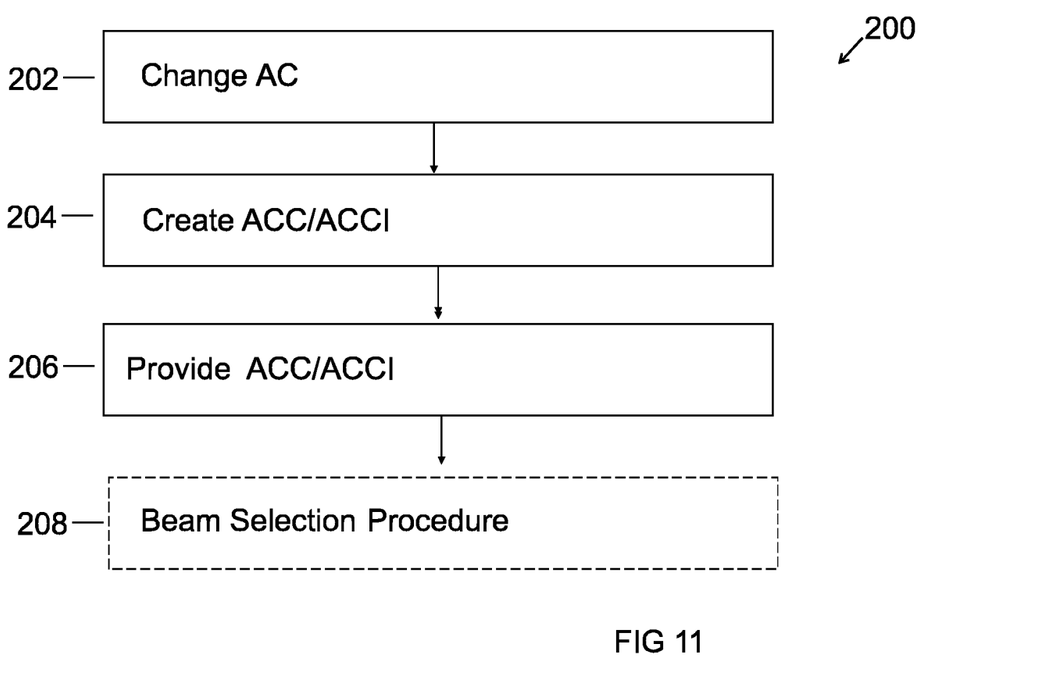
FIG. 11 shows another example of the subject matter described herein.

FIG. 11 illustrates an example of a method 200 comprising:

at block 202, changing an antenna configuration of the apparatus used to enable operation of the apparatus as a first node of a radio telecommunication network;
at block 204, creating an antenna configuration correction or an antenna configuration correction index (ACCI) of the first node;
at block 206 providing the antenna configuration correction or the antenna configuration correction index of the first node for use in a beam selection procedure for enabling data communication by the first node.

The method can be performed at the apparatus 10.

Optionally the method can additionally comprise, at block 208, performing at least part of a beam selection procedure for enabling data communication by the first node, using the antenna configuration correction or the antenna configuration correction index of the first node.

Figure 12:
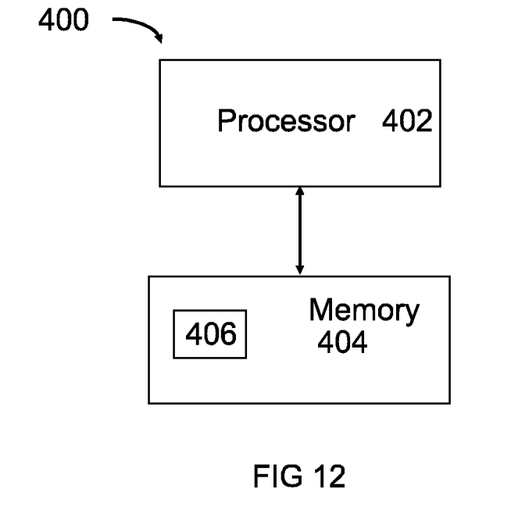
FIG. 12 shows another example of the subject matter described herein.

FIG. 12 illustrates an example of a controller 400. Implementation of a controller 400 may be as controller circuitry. The controller 400 may be implemented in hardware alone, have certain aspects in software including firmware alone or can be a combination of hardware and software (including firmware).

As illustrated in FIG. 12 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 10 when loaded into the processor 402. The computer program instructions, of the computer program 406, provide the logic and routines that enables the apparatus to perform the methods illustrated in FIGS. 2 to 11. The processor 402 by reading the memory 404 is able to load and execute the computer program 406.

The apparatus 10 therefore comprises:

at least one processor 402; and
at least one memory 404 including computer program code the at least one memory 404 and the computer program code configured to, with the at least one processor 402, cause the apparatus 10 at least to perform:
changing an antenna configuration of the apparatus used to enable operation of the apparatus as a first node of a radio telecommunication network;
creating an antenna configuration correction or an antenna configuration correction index (ACCI) of the first node;
providing the antenna configuration correction or the antenna configuration correction index of the first node for use in a beam selection procedure for enabling data communication by the first node.

Figure 13:
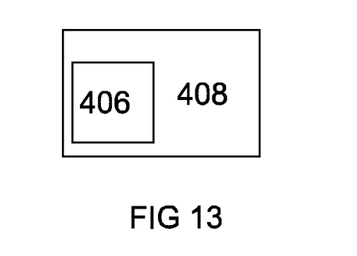
FIG. 13 shows another example of the subject matter described herein.

As illustrated in FIG. 13, the computer program 406 may arrive at the apparatus 10 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The apparatus 10 may propagate or transmit the computer program 406 as a computer data signal.

Computer program instructions for causing an apparatus to perform at least the following or for performing at least the following:

causing changing of an antenna configuration of the apparatus used to enable operation of the apparatus as a first node of a radio telecommunication network;
causing creation of an antenna configuration correction or an antenna configuration correction index (ACCI) of the first node;
causing provision of the antenna configuration correction or the antenna configuration correction index of the first node for use in a beam selection procedure for enabling data communication by the first node.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 to 11 may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

It will therefore be appreciated that the foregoing examples describe an apparatus 10 (user equipment 110) comprising means for:
changing an antenna configuration 12 of the apparatus 10 used to enable operation of the apparatus 10 as a first node 110, 120 of a radio telecommunication network 100;
creating an antenna configuration correction index (ACCI) of the first node 110, 120;
providing the antenna configuration correction index of the first node 110, 120 for use in a beam selection procedure 70 for enabling data communication by the first node 110, 120.

The user equipment 110 can provide the antenna configuration correction index to a serving base station 120 operating as another node of the radio telecommunications network 100 for use by the serving base station 120 in a beam selection procedure 70 for the user equipment 110.

The user equipment 110 can provide the antenna configuration correction index within the first node 110 for use in (e.g. to trigger) a procedure at the first node 110, 120 that comprises providing, at least, the antenna configuration correction index to a serving base station 120 operating as another node 110, 120 of the radio telecommunications network 100 for use by the serving base station 120 in a beam selection procedure 70 for the user equipment 110.

The procedure at the first node 110, 120 can comprises providing to the serving base station 120 at least a measurement made at the first node 110. The measurement made at the first node 110, 120 can be part of a handover or conditional handover procedure or a beam management procedure.

The user equipment 110 can provide to a serving base station 120 the antenna configuration correction index of the first node 110 for a link to the serving base station 120; and can provide to the serving base station 120 a measurement made at the first node 110, 120 for a link to the serving base station 120.

The user equipment 110 can provide to the serving base station 120 the antenna configuration correction index of the first node 110, 120 for a link to a neighboring non-serving base station 120; and can provide to the serving base station 120 a measurement made at the first node 110, 120 for the link to the neighboring non-serving base station 120.

The user equipment 110 can provide to the serving base station 120 an identification of a beam from the non-serving base station 120 used to make the measurement at the first node 110, 120 for the link to the neighboring non-serving base station 120.

The identification could be beam index, a used time/frequency resource, a RACH opportunity indicator, or something else.

In will therefore be appreciated that the foregoing examples describe an apparatus 10 (serving base station 120$_p$) comprising means for:
changing an antenna configuration 12 of the apparatus 10 used to enable operation of the apparatus 10 as a first node 110, 120 of a radio telecommunication network 100;
creating an antenna configuration correction index (ACCI) of the first node 110, 120; providing the antenna configuration correction index of the first node 110, 120 for use in a beam selection procedure 70 for enabling data communication by the first node 110, 120.

The serving base station 120$_p$ can provide the antenna configuration correction index within the first node 110, 120 for use in a beam selection procedure 70 for user equipment 110 operating as another node 110, 120 of the radio telecommunications network 100

The serving base station 120$_p$ can comprise means for:
receiving at the serving base station 120 an antenna configuration correction index of a UE for a link to the serving base station 120; and receiving at the serving base station 120 a measurement made at the UE for the link to the serving base station 120.

The serving base station 120$_p$ can comprise means for:

receiving at the serving base station 120 an antenna configuration correction index of the UE for a link to a neighboring non-serving base station 120;

receiving at the serving base station 120 a measurement made at the UE for the link to the neighboring non-serving base station 120; and receiving at the serving base station 120 an antenna configuration correction index of a non-serving base station 120 for a link to the UE.

The serving base station 120$_p$ can comprise means for:

receiving at the serving base station 120 an identification of beam of a non-serving base station 120

In will therefore be appreciated that the foregoing examples describe an apparatus 10 (neighboring non-serving base station 120$_p$) comprising means for:

changing an antenna configuration 12 of the apparatus 10 used to enable operation of the apparatus 10 as a first node 110, 120 of a radio telecommunication network 100;

creating an antenna configuration correction index (ACCI) of the first node 110, 120;

providing the antenna configuration correction index of the first node 110, 120 for use in a beam selection procedure 70 for enabling data communication by the first node 110, 120.

The neighboring (non-serving) base station 120$_n$ provides, in response to a request indicating a beam, the antenna configuration correction index associated with the beam (measured on by the user equipment 110) to a serving base station 120 for use by the serving base station 120 in a beam selection procedure 70 for the user equipment 110.

ACC improve the timing of handover, conditional handover and beam management for improved throughput. ACC optimizing time of staying in a beam. ACC reduces the link level loss experienced when to beam selection is executed. ACCI is only two or three bits (limited overhead). ACCI informs without revealing UE implementation designs/secrets.

In the examples described a parameter ACC can be used instead of ACCI. A potential advantage of ACCI over ACC is that it obscures perhaps commercially sensitive detail. A potential advantage of ACC over ACCI is that it has more precision. Therefore examples described with reference to $ACCI_{xY}$ can also be used for ACC by replacing $ACCI_{xY}$ with $ACC_{xY}$.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising
   at least one processor; and
   at least one memory storing instructions that, when executed by the at least one processor cause the apparatus to perform:
   changing an antenna configuration such that the apparatus is configured to operate as a first node of a radio telecommunication network;
   creating an antenna configuration correction index of the first node;
   providing the antenna configuration correction index of the first node for use in a beam selection procedure for enabling data communication by the first node;
   wherein the first node comprises a user equipment, and
   wherein providing the antenna configuration correction index comprises providing the antenna configuration correction index to a serving base station operating as another node of the radio telecommunications network for use by the serving base station in a beam selection procedure for the user equipment.

2. An apparatus, comprising
   at least one processor; and
   at least one memory storing instructions that, when executed by the at least one processor cause the apparatus to perform:
   changing an antenna configuration such that the apparatus is configured to operate as a first node of a radio telecommunication network;
   creating an antenna configuration correction index of the first node;
   providing the antenna configuration correction index of the first node for use in a beam selection procedure for enabling data communication by the first node;
   wherein the first node comprises a user equipment, and
   wherein providing the antenna configuration correction index comprises providing the antenna configuration correction index within the first node for use in a procedure at the first node that comprises providing, at least, the antenna configuration correction index to a serving base station operating as another node of the radio telecommunications network for use by the serving base station in a beam selection procedure for the user equipment.

3. The apparatus as claimed in claim 2, wherein the procedure at the first node comprises providing to the serving base station at least a measurement made at the first node.

4. The apparatus as claimed claim 3, wherein the measurement made at the first node is part of a handover or conditional handover procedure or a beam management procedure.

5. An apparatus, comprising
   at least one processor; and
   at least one memory storing instructions that, when executed by the at least one processor cause the apparatus to perform:
   changing an antenna configuration such that the apparatus is configured to operate as a first node of a radio telecommunication network;
   creating an antenna configuration correction index of the first node;
   providing the antenna configuration correction index of the first node for use in a beam selection procedure for enabling data communication by the first node;
   providing to a serving base station the antenna configuration correction index of the first node for a link to the serving base station; and
   providing to the serving base station a measurement made at the first node for a link to the serving base station.

6. The apparatus as claimed in claim 5, wherein the at least one memory and the instructions, when executed by the at least one processor, further cause the apparatus to perform:
   providing to the serving base station the antenna configuration correction index of the first node for a link to a neighboring non-serving base station; and
   providing to the serving base station a measurement made at the first node for the link to the neighboring non-serving base station.

7. The apparatus as claimed in claim 6, wherein the at least one memory and the instructions, when executed by the at least one processor, further cause the apparatus to perform:
   providing to the serving base station an identification of a beam from the non-serving base station used to make the measurement at the first node for the link to the neighboring non-serving base station.

* * * * *